(12) United States Patent
Hwang et al.

(10) Patent No.: US 12,087,283 B2
(45) Date of Patent: Sep. 10, 2024

(54) ELECTRONIC APPARATUS AND CONTROLLING METHOD THEREOF

(71) Applicant: Samsung Electronics Co., Ltd., Suwon-si (KR)

(72) Inventors: Dohyeong Hwang, Suwon-si (KR); Jongyeong Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 17/484,516

(22) Filed: Sep. 24, 2021

(65) Prior Publication Data

US 2022/0148575 A1    May 12, 2022

Related U.S. Application Data

(63) Continuation of application No. PCT/KR2021/009654, filed on Jul. 26, 2021.

(30) Foreign Application Priority Data

Nov. 12, 2020  (KR) ........................ 10-2020-0151247

(51) Int. Cl.
*G10L 15/22*    (2006.01)
*A47L 9/28*    (2006.01)
(Continued)

(52) U.S. Cl.
CPC ............ *G10L 15/08* (2013.01); *A47L 9/2805* (2013.01); *A47L 9/2857* (2013.01); *G10L 25/78* (2013.01);
(Continued)

(58) Field of Classification Search
None
See application file for complete search history.

(56) References Cited

U.S. PATENT DOCUMENTS 6,850,496 B1 * 2/2005 Knappe ................ H04L 65/403
370/266
9,818,403 B2    11/2017 Nishikawa
(Continued)

FOREIGN PATENT DOCUMENTS

JP            6433903 B2    12/2018
KR    10-2018-0125241 A    11/2018
(Continued)

OTHER PUBLICATIONS

International Search report and written opinion dated Nov. 26, 2021, issued in International Application No. PCT/KR2021/009654.

*Primary Examiner* — Jakieda R Jackson
(74) *Attorney, Agent, or Firm* — Jefferson IP Law, LLP

(57) ABSTRACT

An electronic apparatus and a controlling method thereof are provided. The electronic apparatus includes a communication interface configured to communicate with other electronic apparatuses, a memory configured to store location information of the electronic apparatus and the other electronic apparatuses, a microphone configured to detect sound using a plurality of channels, and a processor configured to, based on a voice recognition function being activated, perform a voice recognition operation regarding a user's uttered voice received through the microphone, based on a trigger voice being identified through the microphone, identify an utterance direction of the trigger voice, control the communication interface to share the identified utterance direction with the other electronic apparatuses, estimate an utterance location based on information regarding the utterance direction received from the other electronic apparatuses and the identified utterance direction, and activate a voice recognition function based on the stored location information and the estimated utterance location.

12 Claims, 8 Drawing Sheets

(51) Int. Cl.
*G10L 15/08* (2006.01)
*G10L 25/78* (2013.01)

(52) U.S. Cl.
CPC .. *G10L 2015/088* (2013.01); *G10L 2025/783* (2013.01)

(56) References Cited

U.S. PATENT DOCUMENTS

| | | | | |
|---|---|---|---|---|
| 10,134,399 | B2* | 11/2018 | Lang | G06F 3/165 |
| 10,354,653 | B1* | 7/2019 | Vijayvergia | G10L 15/26 |
| 2005/0080619 | A1* | 4/2005 | Choi | G03B 29/00 |
| | | | | 704/215 |
| 2008/0182518 | A1* | 7/2008 | Lo | H04N 21/43632 |
| | | | | 455/41.3 |
| 2011/0218812 | A1* | 9/2011 | Patel | G06Q 30/04 |
| | | | | 704/277 |
| 2012/0014525 | A1* | 1/2012 | Ko | H04S 7/40 |
| | | | | 381/17 |
| 2012/0086568 | A1* | 4/2012 | Scott | G05B 15/02 |
| | | | | 340/501 |
| 2013/0029684 | A1* | 1/2013 | Kawaguchi | H04R 3/005 |
| | | | | 455/456.1 |
| 2013/0266151 | A1* | 10/2013 | Kishinami | H04R 1/227 |
| | | | | 381/71.7 |
| 2015/0228293 | A1* | 8/2015 | Gunawan | G10L 21/0272 |
| | | | | 704/225 |
| 2015/0279356 | A1* | 10/2015 | Lee | G10L 15/20 |
| | | | | 704/251 |
| 2016/0049150 | A1 | 2/2016 | Nishikawa | |
| 2016/0077794 | A1* | 3/2016 | Kim | G10L 15/20 |
| | | | | 704/275 |
| 2016/0154089 | A1* | 6/2016 | Altman | G08B 29/26 |
| | | | | 367/124 |
| 2016/0155443 | A1* | 6/2016 | Khan | G06F 3/167 |
| | | | | 704/275 |
| 2016/0241976 | A1* | 8/2016 | Pearson | G11B 27/11 |
| 2017/0090864 | A1* | 3/2017 | Jorgovanovic | H04M 11/007 |
| 2017/0133011 | A1* | 5/2017 | Chen | H04L 12/2832 |
| 2018/0018964 | A1* | 1/2018 | Reilly | G10L 15/02 |
| 2018/0213364 | A1* | 7/2018 | Segal | H04L 51/222 |
| 2018/0308490 | A1* | 10/2018 | Lim | G10L 15/18 |
| 2018/0358009 | A1* | 12/2018 | Daley | G06F 3/167 |
| 2019/0044745 | A1* | 2/2019 | Knudson | H04W 4/029 |
| 2019/0074008 | A1* | 3/2019 | Beckhardt | G10L 15/22 |
| 2019/0104119 | A1* | 4/2019 | Giorgi | H04L 63/102 |
| 2019/0364375 | A1* | 11/2019 | Soto | G10L 15/22 |
| 2019/0392834 | A1 | 12/2019 | Yi et al. | |
| 2020/0013392 | A1 | 1/2020 | Chae | |
| 2020/0072937 | A1 | 3/2020 | Baek et al. | |
| 2020/0074988 | A1 | 3/2020 | Park et al. | |
| 2020/0184964 | A1* | 6/2020 | Myers | G06F 3/167 |
| 2020/0294503 | A1 | 9/2020 | Ryu et al. | |
| 2020/0322540 | A1* | 10/2020 | Tsujimoto | H04N 23/695 |
| 2021/0398528 | A1 | 12/2021 | Kim et al. | |
| 2022/0254344 | A1* | 8/2022 | Park | G10L 15/22 |
| 2022/0345820 | A1* | 10/2022 | Dickins | G06N 20/00 |

FOREIGN PATENT DOCUMENTS

| | | |
|---|---|---|
| KR | 10-2019-0003157 A | 1/2019 |
| KR | 10-1975423 B1 | 5/2019 |
| KR | 10-2019-0084003 A | 7/2019 |
| KR | 10-2019-0096861 A | 8/2019 |
| KR | 10-2019-0107622 A | 9/2019 |
| KR | 10-2020-0049020 A | 5/2020 |
| KR | 10-2020-0050152 A | 5/2020 |
| KR | 10-2020-0109954 A | 9/2020 |

* cited by examiner

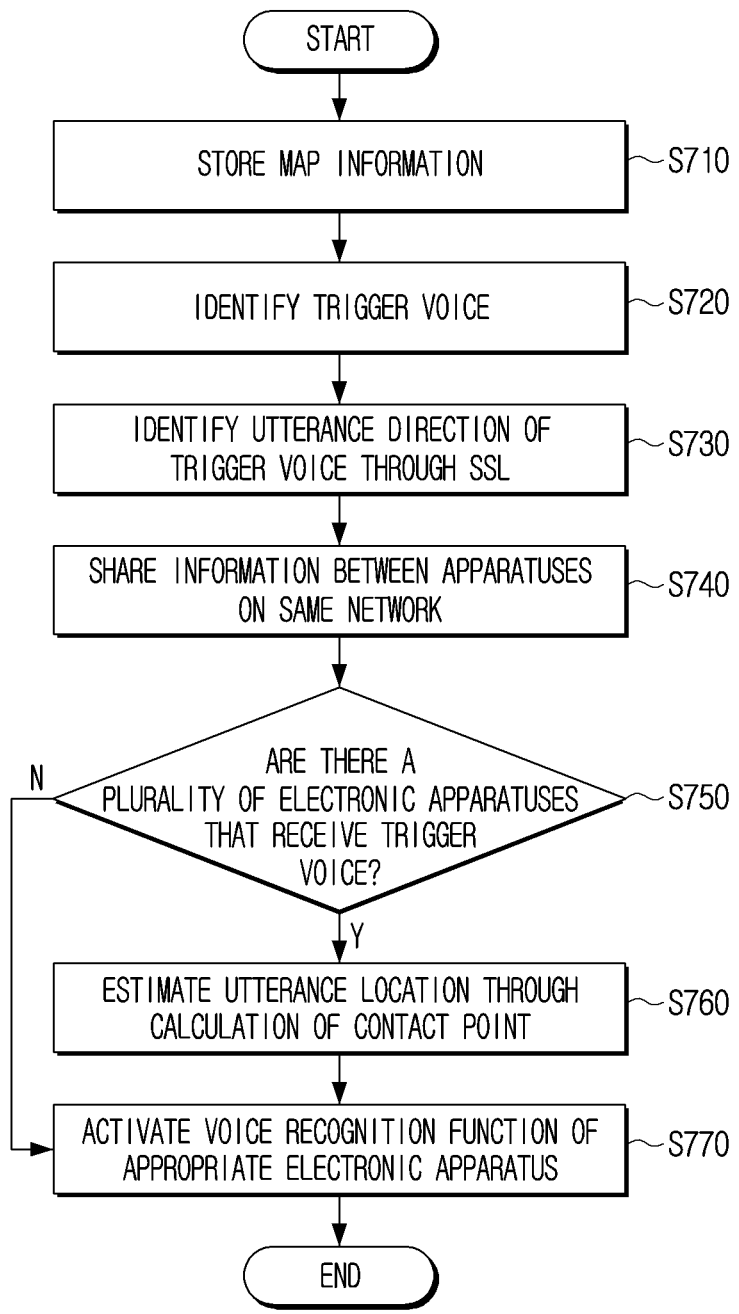

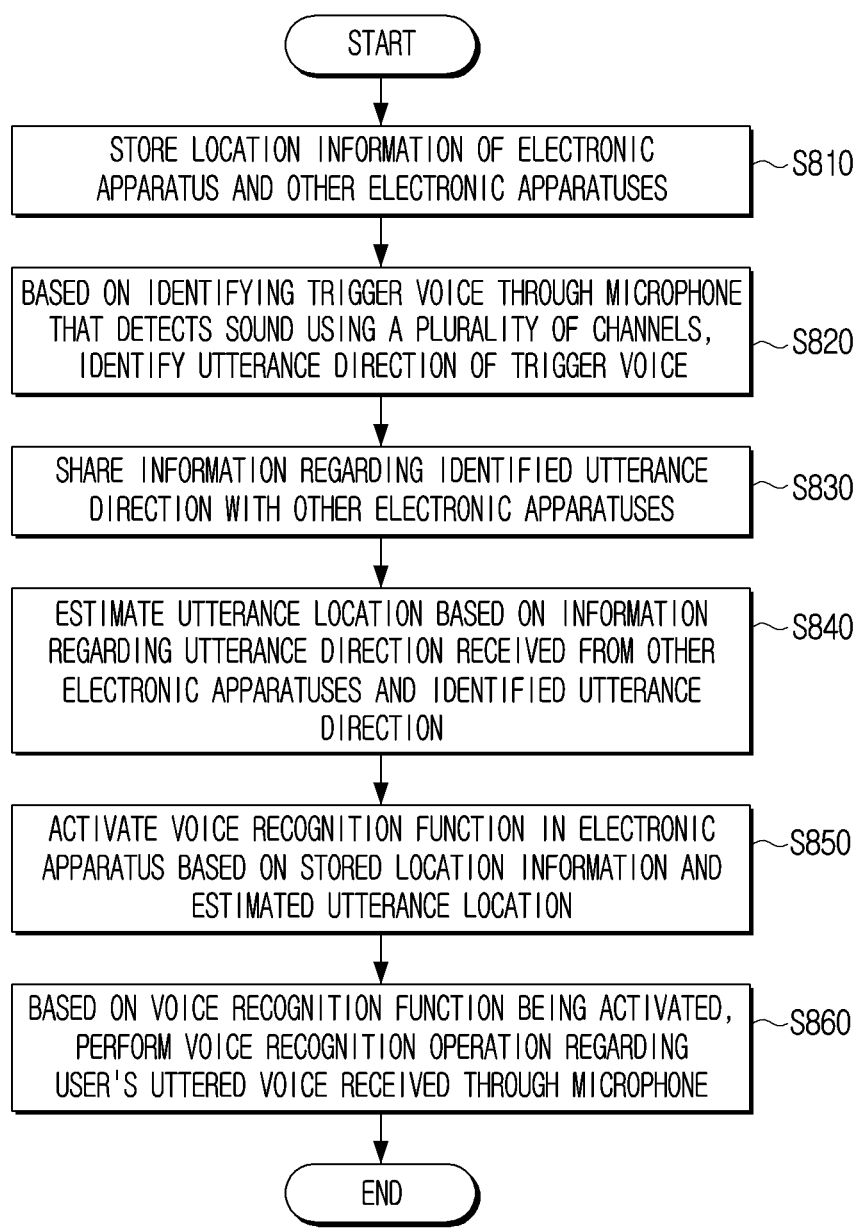

ELECTRONIC APPARATUS AND CONTROLLING METHOD THEREOF

CROSS-REFERENCE TO RELATED APPLICATION(S)

This application is a continuation application, claiming priority under § 365(c), of an International application No. PCT/KR2021/009654, filed on Jul. 26, 2021, which is based on and claims the benefit of a Korean patent application number 10-2020-0151247, filed on Nov. 12, 2020, in the Korean Intellectual Property Office, the disclosure of which is incorporated by reference herein in its entirety.

BACKGROUND

1. Field

The disclosure relates to an electronic apparatus providing a voice recognition function and a controlling method thereof. More particularly, the disclosure relates to an electronic apparatus that estimates an utterance location of a user voice by sharing information with other electronic apparatuses and activating a voice recognition function of one electronic apparatus based on the utterance location and a controlling method thereof.

2. Description of Related Art

Recently, with the development of voice recognition technology, various electronic apparatuses that provide services using artificial intelligence assistants (e.g., Bixby™, Assistant™, Alexa™, etc.) to perform user requests included in a user voice have been provided.

The user may use a specific voice command as a trigger voice (or a wake-up word) to activate a voice recognition function of an electronic apparatus by uttering the trigger word, and voice recognition regarding the user's uttered voice may not be performed until the trigger word is input. Meanwhile, various voice recognition apparatuses in the same space may have the same trigger word and, in this case, there is a problem that several electronic apparatuses can be activated at the same time by the utterance of the user's trigger word.

Accordingly, in the related art, the voice recognition function of one apparatus having the highest input sound pressure is controlled to be activated, allowing one electronic apparatus closest distance to the user to be activated.

However, there is a problem in that an apparatus other than the nearest apparatus from the location where the user's voice is uttered is activated due to the difference in hardware performance of each voice recognition apparatus and ambient noise.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus that estimates a user's voice utterance location by sharing location information of each of the various electronic apparatuses that provide a voice recognition function and direction information regarding the user's voice utterance location and activates the voice recognition function of one electronic apparatus located at the closest distance from the user's voice utterance location and a controlling method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes an electronic apparatus configured to provide a voice recognition function including a communication interface configured to communicate with other electronic apparatuses, a memory configured to store location information of the electronic apparatus and the other electronic apparatuses, a microphone configured to detect sound using a plurality of channels, and a processor configured to, based on a voice recognition function being activated, perform a voice recognition operation regarding a user's uttered voice received through the microphone. The processor is configured to, based on a trigger voice being identified through the microphone, identify an utterance direction of the trigger voice, control the communication interface to share the identified utterance direction with the other electronic apparatuses, and estimate an utterance location based on information regarding the utterance direction received from the other electronic apparatuses and the identified utterance direction, and activate a voice recognition function of the electronic apparatus based on the stored location information and the estimated utterance location.

The processor may be further configured to, based on identifying that a distance between the estimated utterance location and the electronic apparatus is less than a distance between the other electronic apparatuses and the estimated utterance location, activate the voice recognition function.

The memory may be further configured to store map information regarding an environment in which the electronic apparatus and the other electronic apparatuses are located, and the location information may be location information on a map in the map information.

The map information may be generated in a robot cleaner capable of mapping a surrounding environment.

The processor may be further configured to identify a sound pressure of the trigger voice, control the communication interface to share information regarding the identified sound pressure together with information regarding the identified utterance direction, and activate a voice recognition function of the electronic apparatus based on the estimated utterance location and sound pressure information in each of a plurality of electronic apparatuses.

The processor may be further configured to preferentially compare distances between a plurality of electronic apparatuses and an utterance location, and based on a difference in distance being less than a predetermined value, activate a voice recognition function based on sound pressure information.

The processor may be further configured to, based on the voice recognition function being activated, perform voice recognition regarding a user request included in the user's uttered voice, determine whether it is possible for the electronic apparatus to perform an operation corresponding to the user request, and perform the operation corresponding to the user request based on a result of the determination.

The processor may be further configured to, based on determining that it is possible for the electronic apparatus to perform the operation corresponding to the user request, perform the operation corresponding to the user request.

The processor may be further configured to, based on determining that it is not possible for the electronic apparatus to perform the operation corresponding to the user request, control the communication interface to transmit a control signal for controlling to perform the operation corresponding to the user request to another electronic apparatus.

The processor may be further configured to control the communication interface to transmit the control signal to the other electronic apparatus located at a closest distance from the estimated utterance location from among a plurality of other electronic apparatuses capable of performing the operation corresponding to the user request.

In accordance with another aspect of the disclosure, a controlling method of an electronic apparatus configured to provide a voice recognition function is provided. The controlling method includes storing location information of the electronic apparatus and other electronic apparatuses, based on a trigger voice being identified through a microphone that detects sound using a plurality of channels, identifying an utterance direction of the trigger voice, sharing information regarding the identified utterance direction with the other electronic apparatuses, estimating an utterance location based on information regarding the utterance direction received from the other electronic apparatuses and the identified utterance direction, activating a voice recognition function of the electronic apparatus based on the stored location information and the estimated utterance location, and based on a voice recognition function being activated, performing a voice recognition function regarding the user's uttered voice received through the microphone.

The activating of the voice recognition function may include, based on identifying that a distance between the estimated utterance location and the electronic apparatus is less than a distance between the other electronic apparatuses and the estimated utterance location, activating the voice recognition function.

The storing may include storing map information regarding an environment in which the electronic apparatus and the other electronic apparatuses are located, and the location information may be location information on a map in the map information.

The map information may be generated in a robot cleaner capable of mapping a surrounding environment.

The method may further include identifying a sound pressure of the trigger voice, and the sharing may include sharing information regarding the identified sound pressure together with information regarding the identified utterance direction, and the activating of the voice recognition function may include activating the voice recognition function of the electronic apparatus based on the estimated utterance location and sound pressure information in each of a plurality of electronic apparatuses.

The activating of the voice recognition function may include preferentially comparing distances between a plurality of electronic apparatuses and an utterance location, and based on a difference in distance being less than a predetermined value, activating the voice recognition function based on sound pressure information.

The performing of the voice recognition function may further include, performing voice recognition regarding a user request included in a user's uttered voice, determining whether it is possible for the electronic apparatus to perform an operation corresponding to the user request, and performing the operation corresponding to the user request based on a result of the determination.

The method may further include, based on determining that it is not possible for the electronic apparatus to perform the operation corresponding to the user request, transmitting a control signal for controlling to perform the operation corresponding to the user request to another electronic apparatus.

The transmitting of the control signal to the other electronic apparatus may include transmitting the control signal to the other electronic apparatus located at a closest distance from the estimated utterance location from among a plurality of other electronic apparatuses capable of performing the operation corresponding to the user request.

Meanwhile, a computer readable recording medium in which a program for controlling an electronic apparatus according to an embodiment is stored, is provided. The program includes instructions for storing location information of the electronic apparatus and other electronic apparatuses, based on a trigger voice being identified through a microphone that detects sound using a plurality of channels, identifying an utterance direction of the trigger voice, sharing information regarding the identified utterance direction with other electronic apparatuses, estimating an utterance location based on information regarding the utterance direction received from other electronic apparatuses and the identified utterance direction, activating a voice recognition function of the electronic apparatus based on the stored location information and the estimated utterance location, and, based on a voice recognition function being activated, performing a voice recognition function regarding the user's uttered voice received through the microphone.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a flowchart provided to explain an operation of an electronic apparatus according to an embodiment of the disclosure; and FIG. 8 is a view provided to explain a controlling method of an electronic apparatus according to an embodiment of the disclosure.

Throughout the drawings, like reference numerals will be understood to refer to like parts, components, and structures.

DETAILED DESCRIPTION

Figure 1:
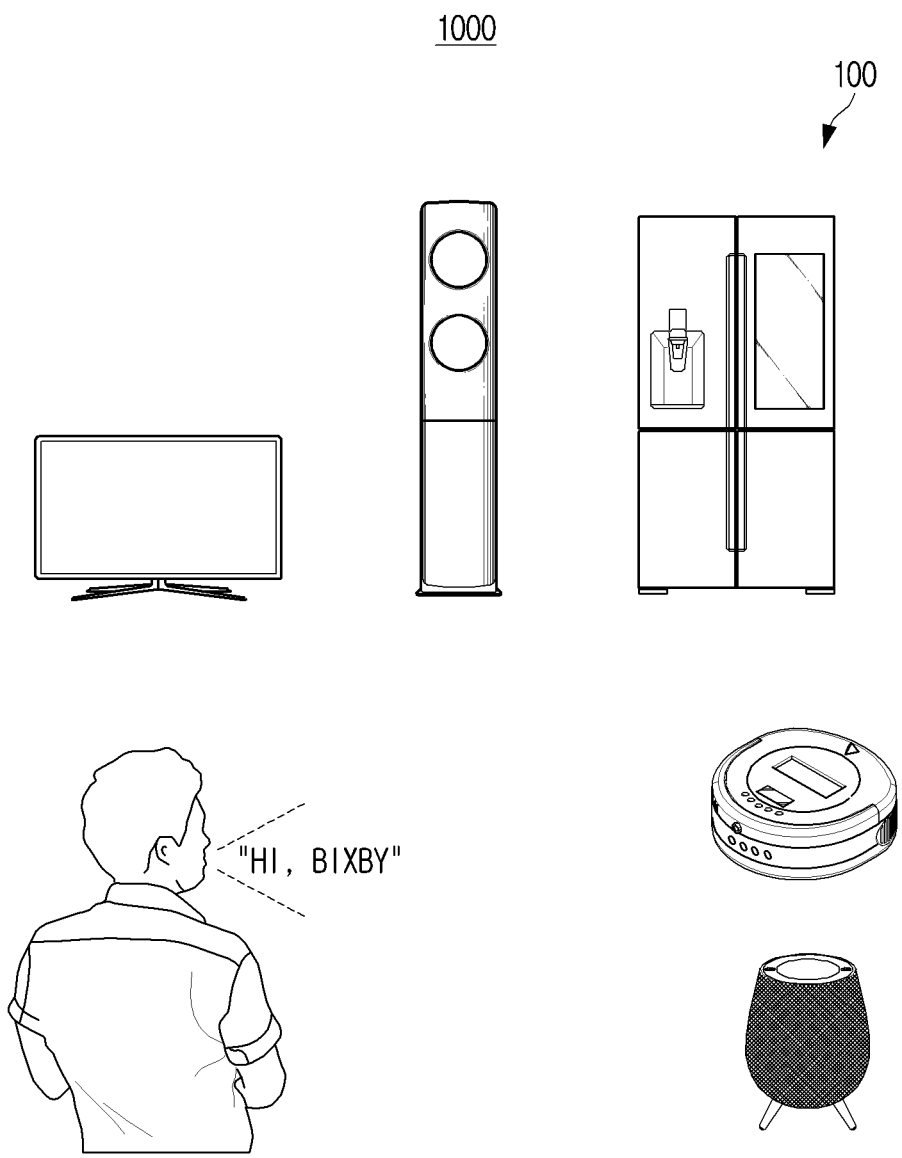
FIG. 1 is a view provided to schematically explain a voice recognition system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It needs to be understood that there is no limitation to the order of each step in the description of this specification, unless a preceding step is required to be performed logically and temporally before its subsequent step. That is, except for such an exceptional case, the essence of the disclosure is not affected even if a process described as the subsequent step is performed before a process described as the preceding step, and the scope of the disclosure also needs to be defined regardless of the order of the steps.

In the disclosure, an expression "have," "may have," "include," "may include," or the like, indicates an existence of a corresponding feature (e.g., a numerical value, a function, an operation, a component such as a part, or the like), and does not exclude an existence of an additional feature.

Expressions "first," "second," or the like, used in the disclosure may indicate various components regardless of a sequence and/or importance of the components, will be used only in order to distinguish one component from the other components, and do not limit the corresponding components. For example, the first component described in the disclosure may be named the second component and the second component may also be similarly named the first component, without departing from the scope of the disclosure.

In the disclosure, components necessary for description of each embodiment have been described, and the disclosure is not limited thereto. Accordingly, some components may be changed or omitted, or other components may be added. In addition, components may be distributed and arranged in different independent devices.

Further, embodiments of the disclosure will be described in detail with reference to the accompanying drawings and the features described in the accompanying drawings, but the disclosure is neither restricted nor limited by the embodiments.

Hereinafter, the disclosure will be described in detail with reference to the accompanying drawings.

FIG. 1 is a view provided to schematically explain a voice recognition system according to an embodiment of the disclosure.

Referring to FIG. 1, a voice recognition system 1000 may include various types of electronic apparatuses 100 that provide a voice recognition function.

The voice recognition function may include a function of converting an acoustic signal acquired by the electronic apparatus 100 through a sound senor such as a microphone into a word or a sentence. In general, the voice recognition function performs a task of removing a noise after extracting a voice signal and subsequently, voice recognition may be performed by extracting features of the voice signal and comparing them with a voice model database (DB).

Accordingly, the electronic apparatus 100 may perform an operation corresponding to a user request (e.g., a command for controlling the electronic apparatus) included in a user's uttered voice or provide various life convenience services such as providing a response regarding information requested by the user.

Each of the electronic apparatuses 100 may perform the voice recognition function after identifying a trigger voice. For example, the electronic apparatus 100 may not perform voice recognition regarding the user's uttered voice before the trigger voice is input, and as the user utters the trigger voice, may activate the voice recognition function of the electronic apparatus.

The trigger voice is a call word for activating the voice recognition function, and may be a specific word or a sentence. For example, the name of the electronic apparatus or an artificial intelligence assistant may be used as the trigger voice. Such a trigger voice may be pre-set in the electronic apparatus or may be changed or set.

Referring to FIG. 1, the user may activate the voice recognition function of the electronic apparatus 100 by uttering "Hi, Bixby" which is the trigger voice. In this case, a plurality of electronic apparatuses providing the voice recognition function may be disposed in the space where the user is located. The electronic apparatuses providing the voice recognition function may include smart speakers, televisions (TVs), air conditioners, air purifiers, washing machines, refrigerators, robot cleaners, kitchen appliances, but are not limited thereto.

When the user utters the trigger word, the user generally may have an intention to receive a service through the voice recognition function using an electronic apparatus located at the nearest distance. However, if various voice recognition apparatuses disposed in the same space have the same trigger voice, there may be a problem in that several electronic apparatuses are simultaneously activated by the user's trigger voice utterance.

Therefore, the disclosure discloses a voice recognition system capable of estimating the user's voice utterance location and activating the voice recognition function of one electronic apparatus located at the nearest distance from the user's voice utterance location and an electronic apparatus having the same.

Figure 2:
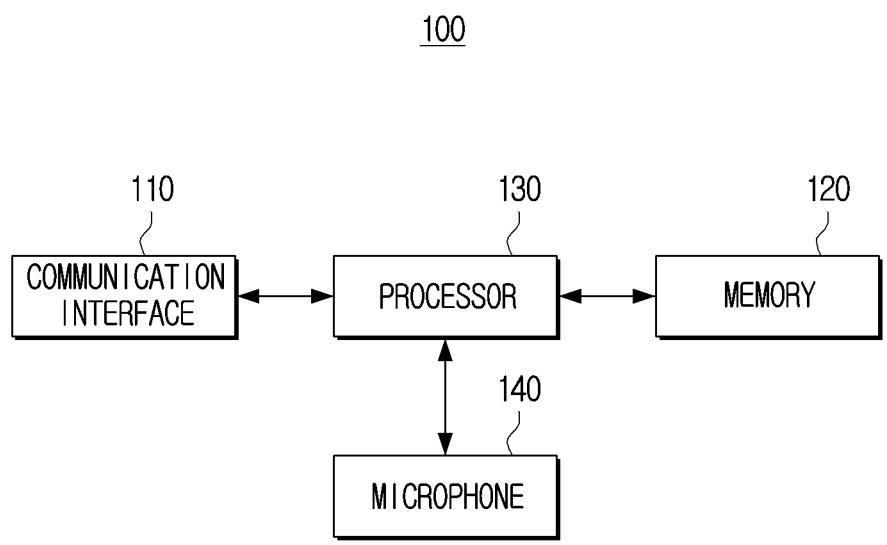
FIG. 2 is a block diagram provided to explain configuration of an electronic apparatus according to an embodiment of the disclosure.

FIG. 2 is a block diagram provided to explain configuration of an electronic apparatus according to an embodiment of the disclosure.

Referring to FIG. 2, the electronic apparatus 100 may include a communication interface 110, a memory 120, a processor 130, and a microphone 140.

The communication interface 110 may communicate with an external apparatus to transmit and receive various data. For example, the electronic apparatus 100 may share various information with other electronic apparatuses through the communication interface 110. Detailed description regarding information sharing between electronic apparatuses will be provided later.

Meanwhile, the communication interface 110 may communicate with an electronic apparatus not only through a Local Area Network (LAN), an Internet network, or a mobile communication network but also through various communication methods such as Bluetooth (BT), Bluetooth Low Energy (BLE), WI-FI, WI-FI Direct, Zigbee, Near Field Communication (NFC), etc. To this end, the communication interface 110 may include various communication modules for performing network communication. For example, the communication interface 110 may include a Bluetooth chip, a Wi-Fi chip, a wireless chip, etc.

The memory 120 is electrically connected to the processor 130, and may story data necessary for various embodiments of the disclosure.

The memory 120 may store instructions or data related to at least one of other components of the electronic apparatus 100. In particular, the memory 120 may be implemented as a non-volatile memory, a volatile memory, a flash-memory, a hard disc drive (HDD), a solid state drive (SSD), or the like. The memory 120 is accessed by the processor 130, and data read/write/edit/delete/update by the processor 130 may be performed. In the disclosure, a term 'memory' may include the memory 120, a read only memory (ROM) 121 in the processor 130, a random access memory (RAM), or a memory card (not illustrated) (for example, a micro secure digital (SD) card or a memory stick) mounted in the electronic apparatus 100. In addition, the memory 120 may store programs, data, etc. for configuring various screens to be displayed on the display area of the display 150.

The memory 120 may store location information of the electronic apparatus 100 and location information of other electronic apparatuses. Specifically, the memory 120 may store location information of the electronic apparatus 100 and other electronic apparatuses included in map information by storing map information regarding the environment where the electronic apparatus 100 is located. Detailed description regarding the map information stored in the memory 120 will be described later with reference to FIG. 5.

The microphone 140 may receive information on sound generated around the electronic apparatus 100. For example, the microphone 140 may receive a user's uttered voice. The user's uttered voice may be a voice for executing a specific function of the electronic apparatus 100, for example, a voice for activating a voice recognition function or a voice for executing an operation corresponding to a user request such as a command for controlling the electronic apparatus.

The microphone 140 may have a plurality of channels and recognize a direction in which a voice input to the microphone 140 is uttered through the plurality of channels. For example, the microphone 140 may detect the direction of input sound through Sound Source Localization (SSL) to which a sound direction detection technology using Delay of Arrival (DOA) of a sound source input to each channel is applied. In this case, if the microphone 140 includes two channels, the microphone 140 may detect a direction in a range of 180 degrees, and if the microphone 140 includes three channels, the microphone 140 may detect a direction in a range of 360 degrees.

As an example of a method of detecting the direction of a sound source through SSL, the direction in which the input sound source is generated may be recognized using the difference in distance between a plurality of channels included in the microphone 140 and in time between sound source signals input to each channel. For example, if a first channel and a second channel are arranged sequentially at a predetermined interval, when a sound signal is input to the first channel and the second channel sequentially, it may be recognized that the direction where the sound source is generated is closer to the location of the first channel The processor 130 is electrically connected to the communication interface 110, the memory 120 and the microphone 140, and may control the overall operations of the electronic apparatus 100.

According to an embodiment, the processor 130 may be implemented as a digital signal processor (DSP) processing a digital signal, a microprocessor, or a time controller (TCON). However, the processor 130 is not limited thereto, but may include one or more of a central processing unit (CPU), a micro controller unit (MCU), a micro processing unit (MPU), a controller, an application processor (AP) or a communication processor (CP), an ARM processor, or an Artificial Intelligence (AI) processor, or may be defined by these terms. In addition, the processor 130 may be implemented as a system-on-chip (SoC) or a large scale integration (LSI) in which a processing algorithm is embedded or may be implemented in a field programmable gate array (FPGA) form. The processor 130 may perform various functions by executing computer executable instructions stored in the memory 120.

When a trigger voice is received through the microphone 140, the processor 130 may identify the direction in which the trigger voice is uttered based on the received signal. Subsequently, the processor 130 may control the communication interface 110 to share information regarding the identified utterance direction with other electronic apparatuses, and by comprehensively considering utterance direction information received from other electronic apparatuses and location information of electronic apparatuses stored in the memory 120, may estimate the location where the trigger voice is uttered. Detailed description regarding information sharing of the utterance direction and estimation of location where the voice is uttered will be provided later with reference to FIG. 4.

The processor 130 may activate the voice recognition function in the electronic apparatus 100 based on the location information stored in the memory 120 and the estimated utterance location, and when the voice recognition function is activated, may perform a voice recognition function regarding the user's uttered voice. For example, if it is determined that the electronic apparatus 100 is located at the closest distance from the estimated utterance location in comparison with other electronic apparatuses, the processor 130 may activate the voice recognition function of the electronic apparatus 100 and perform a voice recognition operation regarding a user request included in the user's uttered voice. Detailed description regarding the method of determining an electronic apparatus of which voice recognition function is to be activated from among a plurality of electronic apparatuses and an operation of performing voice recognition according to the method will be provided later with reference to FIGS. 4 to 6.

Figure 3:
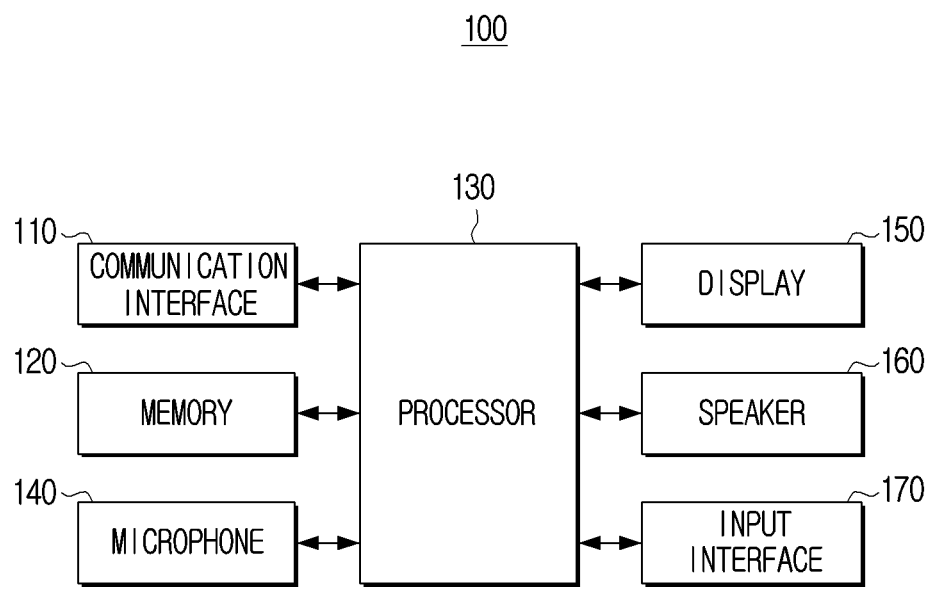
FIG. 3 is a block diagram provided to explain detailed configuration of an electronic apparatus according to an embodiment of the disclosure.

FIG. 3 is a block diagram provided to explain detailed configuration of an electronic apparatus according to an embodiment of the disclosure.

Referring to FIG. 3, the electronic apparatus 100 may include the communication interface 110, the memory 120, the processor 130, the microphone 140, the display 150, the speaker 160, and the input interface 170. Detailed description regarding the components in FIG. 3 which overlap with the components in FIG. 2 will be omitted.

The display 150 may display various images. The images may be a concept including at least one of a still image or a moving image. The display 150 may be implemented in various forms such as liquid crystal display (LCD), organic light-emitting diode (OLED), Liquid Crystal on Silicon (LCoS), Digital Light Processing (DLP), quantum dot (QD) display panel, etc.

The speaker 160 may output various audios. For example, the electronic apparatus 100 may provide a response regarding information requested by a user through the speaker 160 in the form of audio.

The input interface 170 may receive various user commands. For example, the input interface 170 may receive a user command for controlling the electronic apparatus 100. The input interface 170 may include the microphone 140 that receives a user's uttered voice, and may include the display 150 that receives a user command through a touch screen.

Figure 4:
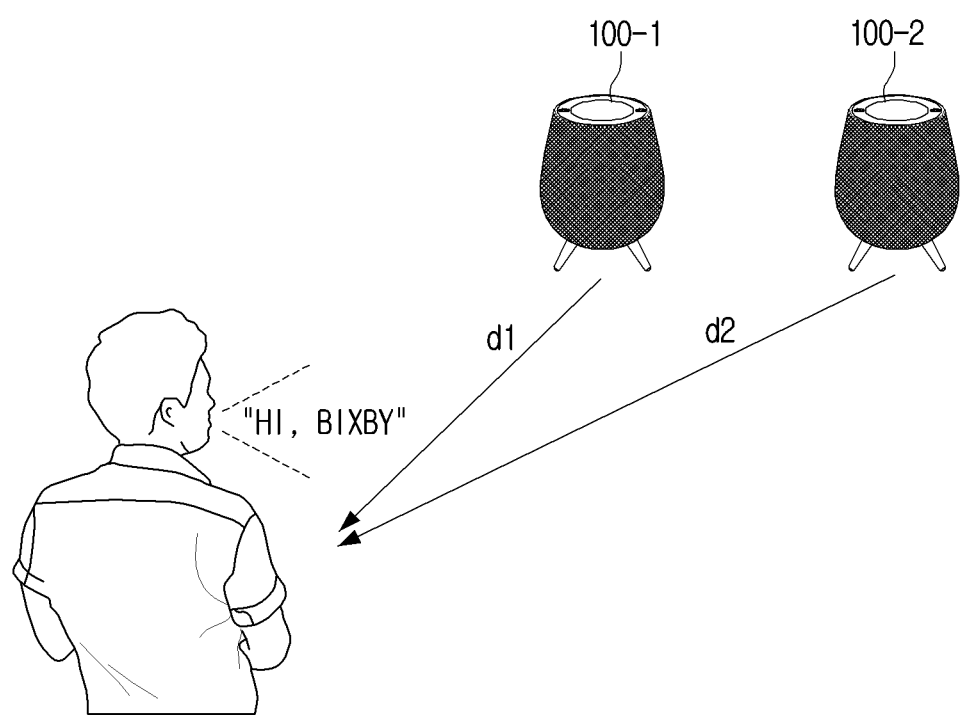
FIG. 4 is a view provided to explain an operation in which an electronic apparatus estimates a user's voice utterance location according to an embodiment of the disclosure.

FIG. 4 is a view provided to explain an operation in which an electronic apparatus estimates a user's voice utterance location according to an embodiment of the disclosure.

Referring to FIG. 4, it illustrates two electronic apparatuses 100 located at different distances from the user. Hereinafter, each of the electronic apparatuses will be referred to as a first electronic apparatus 100-1 and a second electronic apparatus 100-2 for convenience of explanation.

According to an embodiment, the user may utter a trigger voice for activating the voice recognition function of one of the electronic apparatuses 100-1, 100-2. In this case, the first electronic apparatus 100-1 and the second electronic apparatus 100-2 disposed in the same space may receive the trigger voice.

The first electronic apparatus 100-1 and the second electronic apparatus 100-2 may detect the direction in which the trigger voice is uttered through a microphone provided in each of the electronic apparatuses. Referring to FIG. 4, the first electronic apparatus 100-1 may detect that the trigger voice is uttered in a first direction (d1) with reference to the location of the first electronic apparatus 100-1, and the second electronic apparatus 100-2 may detect that the trigger voice is uttered in a second direction (d2) with reference to the location of the second electronic apparatus 100-2. As the feature of detecting a direction through a microphone including a plurality of channels has been described previously, further description thereof will not be provided.

The first electronic apparatus 100-1 and the second electronic apparatus 100-2 may share with each other information regarding the detected directions in which the trigger voice is uttered from each location. For example, a plurality of electronic apparatuses 100 that perform communication using the same network may share information regarding the utterance direction through the corresponding network, and may share information through a communication protocol such as a User Datagram Protocol (UDP).

In addition, each of the electronic apparatuses 100 may store map information regarding an environment in which the electronic apparatuses are located, that is, location information of each of the plurality of electronic apparatuses. Such map information may be provided from an electronic apparatus capable of mapping a surrounding environment, such as a robot cleaner. Detailed description regarding the process of mapping location information of each of the plurality of electronic apparatuses 100 through a robot cleaner will be provided later with reference to FIG. 5.

Each of the electronic apparatuses 100 may compile the utterance direction information detected by itself, the utterance direction information shared with other electronic apparatuses and the location information of each of the electronic apparatuses 100 and calculate a contact point for the utterance location to estimate the location where the trigger voice is uttered.

Each of the electronic apparatuses 100 may calculate a distance from the estimated utterance location of the electronic apparatuses through the estimated utterance location information and the location information of each of the electronic apparatuses 100, and may identify the electronic apparatus 100 located at the closest distance from the utterance location from among the plurality of electronic apparatuses 100 by comparing the calculated distance.

For example, referring to FIG. 4, the first electronic apparatus 100-1 may estimate the utterance location of the trigger voice based on the shared utterance direction information and the location information of the first electronic apparatus 100-1 and the second electronic apparatus 100-2, calculate and compare distances at which each of the first electronic apparatus 100-1 and the second electronic apparatus 100-2 is located from the estimated utterance location, determine that the first electronic apparatus 100-1 is located closer to the utterance location than the second electronic apparatus 100-2, and activate the voice recognition function.

On the other hand, the second electronic apparatus 100-2 may determine that the second electronic apparatus 100-2 is located father from the utterance location of the trigger voice than the first electronic apparatus 100-1, and may not activate the voice recognition function.

Meanwhile, after calculating a distance from the estimated utterance location, the electronic apparatus 100 may compare it with the distance information which is calculated and shared by other electronic apparatuses to determine whether the electronic apparatus 100 corresponds to an apparatus located closest from the uttered location from among electronic apparatuses that share the information with.

FIG. 4 illustrates two electronic apparatuses 100, but the disclosure is not limited thereto. Even in the case where there are more than three electronic apparatuses, the same operation may be conducted to estimate the utterance location, and when each of the electronic apparatuses determines that it is the electronic apparatus at the closest distance from the utterance location, the electronic apparatus may activate the voice recognition function.

Figure 5:
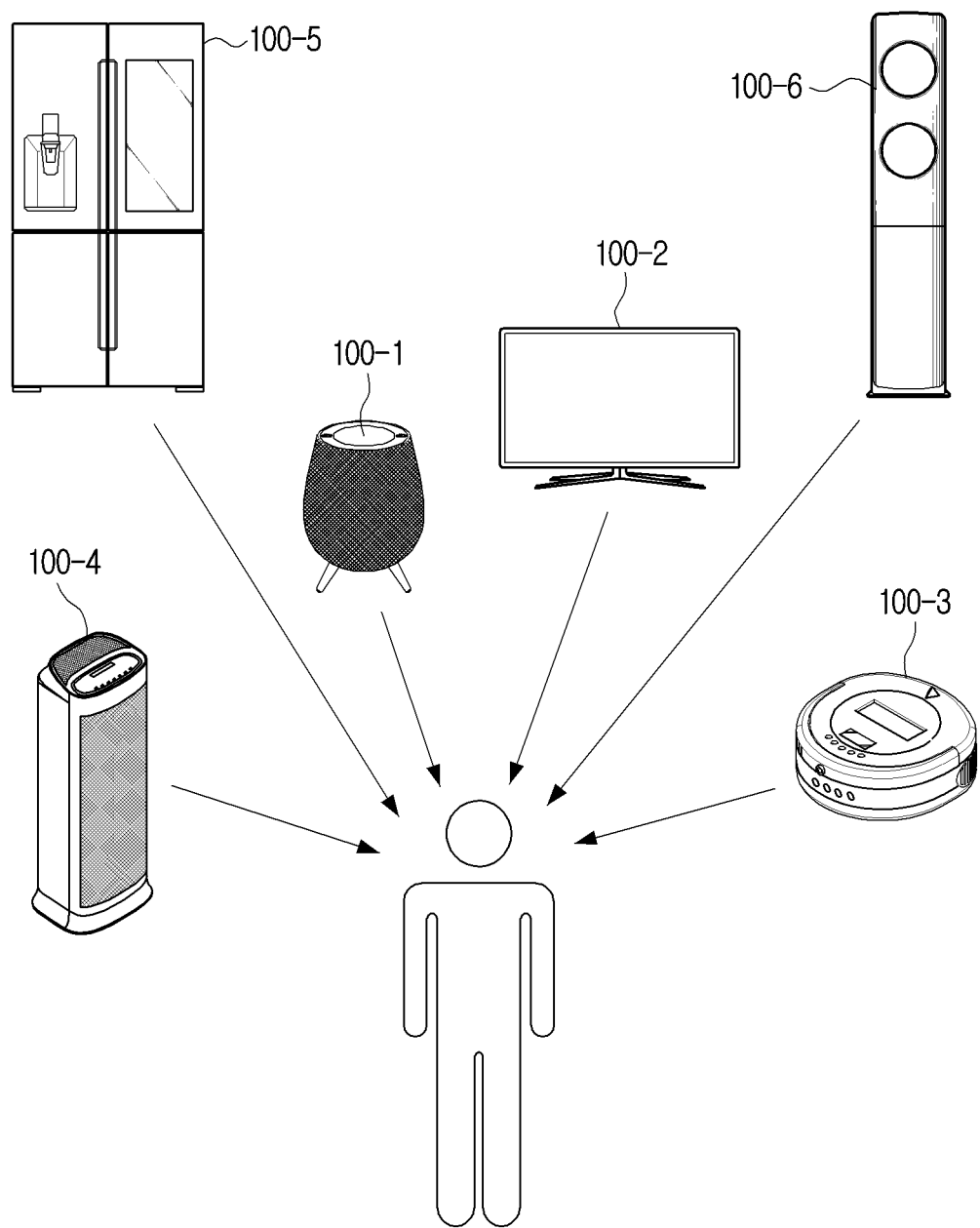
FIG. 5 is a view provided to explain an operation of determining an electronic apparatus of which voice recognition function is activated from among various electronic apparatuses existing in the same space based on map information regarding an environment where a user voice is uttered according to an embodiment of the disclosure.

FIG. 5 is a view provided to explain an operation of identifying an electronic apparatus of which voice recognition function is to be activated from among various electronic apparatuses in the same space based on map information regarding an environment where a user voice is uttered according to an embodiment of the disclosure.

Referring to FIG. 5, when various electronic apparatuses are disposed in an environment around the user, and location information regarding each of the electronic apparatuses may be provided to each electronic apparatus in the form of location information on a map.

For example, the map information may be generated in a robot cleaner capable of mapping the surrounding environment and be transmitted to each electronic apparatus. The robot cleaner may drive an indoor environment to map the indoor structure through automatic mapping technology, and by recognizing electronic apparatuses disposed indoors using an object recognition function, may generate map information including location information of each electronic apparatus.

Specifically, the robot cleaner may map the indoor structure through a sensor that detects a distance from an object, map the indoor structure using a surrounding environment image obtained through a camera, and recognize electronic apparatuses disposed indoors. The robot cleaner may acquire an image regarding a surrounding environment through a camera and analyze the image, and if an electronic apparatus such as a TV and an air conditioner is identified from the image, may store location information in which the identified electronic apparatus is located in map information mapping the indoor structure.

In addition, the user may reflect the location of the electronic apparatus on the map information by directly inputting the location of the electronic apparatus.

Further, each of the electronic apparatuses 100 may store map information regarding an environment where the electronic apparatuses 100 are located, that is, location information of each of the plurality of electronic apparatuses 100. Such map information may be provided by an electronic apparatus capable of mapping a surrounding environment such as a robot cleaner.

Each of the electronic apparatuses 100 may compile the utterance direction information detected by itself, the utterance direction information shared with other electronic apparatuses and the location information of each of the electronic apparatuses 100 and calculate a contact point for the utterance location to estimate the location where the user voice is uttered.

Each of the electronic apparatuses 100 may calculate distances from the estimated utterance location of each electronic apparatus 100 through the estimated utterance location information and location information of each electronic apparatus 100, compare the calculated distances and determine the electronic apparatus 100 at the closest distance from the utterance location from among the plurality of electronic apparatuses 100 as the electronic apparatus of which voice recognition function is to be activated.

For example, referring to FIG. 5, the voice recognition function of the speaker of the electronic apparatus 100-1 which is located at the closest distance from the user from among the plurality of electronic apparatuses 100-1, 100-2, 100-3, 100-4, 100-5, and 100-6 may be activated. A number of the plurality of electronic apparatuses is not limited.

Figure 6:
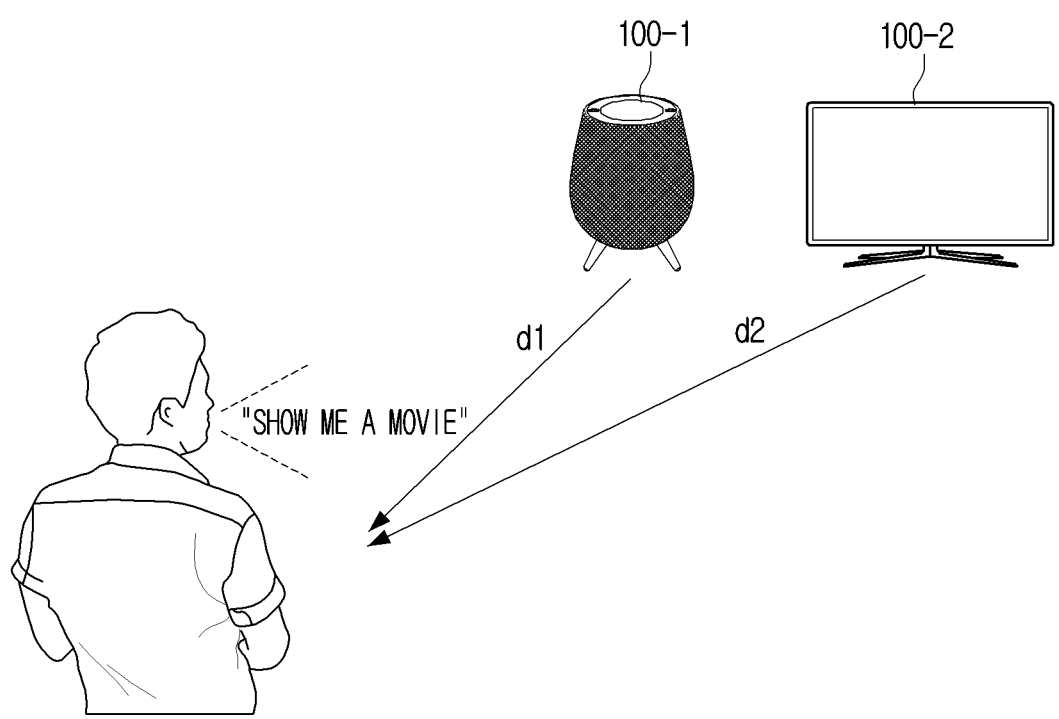
FIG. 6 is a view provided to explain an operation of determining an electronic apparatus of which voice recognition function is activated according to a type of a user request included in a user's uttered voice according to an embodiment of the disclosure.

FIG. 6 is a view provided to explain an operation of determining an electronic apparatus of which voice recognition function is activated according to a type of a user request included in the user's uttered voice according to an embodiment of the disclosure.

Referring to FIG. 6, it illustrates two different types of electronic apparatuses 100 which are located at different distances. Hereinafter, each of the electronic apparatuses will be referred to as the first electronic apparatus 100-1 and the second electronic apparatus 100-2 for convenience of explanation.

According to an embodiment, the first electronic apparatus 100-1 may be a speaker, and the second electronic apparatus 100-2 may be a display apparatus.

In this case, through a trigger voice uttered by a user, the voice recognition function of the first electronic apparatus 100-1 located at a relatively closer than the second electronic apparatus 100-2 from the utterance location may be activated. When the voice recognition function is activated, the first electronic apparatus 100-1 may perform voice recognition regarding a user request included in the user's uttered voice.

Referring to FIG. 6, after the user utters the trigger voice, the user may utter a voice including a user request to show a movie. The first electronic apparatus 100-1 may perform voice recognition regarding "Show me a movie" which is the voice uttered by the user, and receive the user request. In this case, as the first electronic apparatus 100-1 does not include a display capable of displaying an image, the first electronic apparatus 100-1 may determine that an operation corresponding to the input user request cannot be performed.

When determining that the electronic apparatus 100 cannot perform an operation corresponding to a user request, the electronic apparatus 100 may transmit a control signal for controlling to perform the operation corresponding to the user request to another electronic apparatus. In this case, the electronic apparatus may transmit the control signal to another electronic apparatus located at the closest distance from the estimated utterance location from among a plurality of other electronic apparatuses capable of performing the operation corresponding to the user request.

For example, referring to FIG. 6, the first electronic apparatus 100-1 includes a display for displaying an image from among electronic apparatuses located nearby based on shared information, and it may be determined that the electronic apparatus located at the closest distance from the utterance location from among the electronic apparatuses including a display is the second electronic apparatus 100-2. Based on a result of the determination, the first electronic apparatus 100-1 may transmit a control signal for controlling the second electronic apparatus 100-2 to perform an operation corresponding to a user request to the second electronic apparatus 100-2, and the second electronic apparatus 100-2 may receive the control signal and perform the operation corresponding to the user request.

FIG. 7 is a flowchart provided to explain an operation of an electronic apparatus according to an embodiment.

Referring to FIG. 7, the electronic apparatus 100 according to an embodiment may store map information regarding a surrounding environment at operation S710. Subsequently, when a trigger voice is identified at operation S720, the direction in which the trigger voice is uttered is identified through SSL at operation S730, and information regarding the utterance direction may be shared between apparatuses on the same network at operation S740.

Based on the shared information, the electronic apparatus 100 may identify whether there are a plurality of electronic apparatuses that have received the trigger voice at operation S750. When determining that there are no other electronic apparatuses that have received the trigger voice, the electronic apparatus 100 may activate the voice recognition function of the electronic apparatus 100.

Meanwhile, if it is determined that there are a plurality of apparatuses that have received the same trigger voice, the utterance location of the trigger voice may be estimated by calculating a contact point based on the shared information at operation S760, and the voice recognition function of an appropriate electronic apparatus, that is, an electronic apparatus at the closest distance from the utterance location or an electronic apparatus at the closest distance from the utterance location from among electronic apparatuses capable of performing an operation corresponding to a user request, may be activated at operation S770.

FIG. 8 is a view provided to explain a controlling method of an electronic apparatus according to an embodiment of the disclosure.

Referring to FIG. 8, an electronic apparatus providing a voice recognition function may store location information of the electronic apparatus and other electronic apparatuses at operation S810.

The electronic apparatus may store map information regarding environments where the electronic apparatus and other electronic apparatuses are located and, in this case, the location information may be location information on a map in the map information. The map information may be information that is generated in a robot cleaner capable of mapping a surrounding environment and provided to the electronic apparatus, and may include location information of each of various electronic apparatuses that provide a voice recognition function.

In addition, when a trigger voice is identified through a microphone that detects sound using a plurality of channels, the electronic apparatus may identify the utterance direction of the trigger voice at operation S820.

The trigger voice is a call word for activating the voice recognition function, and may be a specific word or a sentence.

In addition, the electronic apparatus may share information regarding the identified utterance direction with other electronic apparatuses at operation S830.

The electronic apparatus may estimate the utterance location based on the utterance direction information received from other electronic apparatuses and the identified utterance direction at operation S840.

Accordingly, by considering the information shared with various electronic apparatuses in a comprehensive manner, it is possible to improve the accuracy of estimating the utterance location of the user voice.

In addition, the electronic apparatus may activate the voice recognition function of the electronic apparatus based on the stored location information and the estimated utterance location at operation S850.

In this case, when identifying that a distance between the estimated utterance location and the electronic apparatus is closer than a distance between other electronic apparatuses and the estimated utterance location, the electronic apparatus may activate the voice recognition function.

Accordingly, it is possible to improve the accuracy of a service that provides a voice recognition function through an electronic apparatus located at the closest distance from the utterance location of a user voice, and user convenience can be enhanced.

Meanwhile, if it is determined that a plurality of electronic apparatuses are within the same distance range from the utterance location, the electronic apparatus of which voice recognition function is to be activated may be determine based on the level of sound pressure input to the electronic apparatuses.

The electronic apparatus may identify the sound pressure of the trigger voice and share information regarding the identified sound pressure together with information regarding the identified utterance direction.

In this case, the electronic apparatus may activate the voice recognition function of the electronic apparatus based on information regarding the estimated utterance location and sound pressure of each of the plurality of electronic apparatuses.

For example, the electronic apparatus may preferentially compare a distance between the plurality of electronic apparatuses and the utterance location, and based on a difference in distance being less than a predetermined value, determine the electronic apparatus to perform its voice recognition function based on sound pressure information.

Accordingly, if it is determined that the plurality of electronic apparatuses are within the same distance range from the utterance location, the voice recognition function of the electronic apparatus having a large input sound pressure may be activated.

When the voice recognition function is activated, the electronic apparatus may perform a voice recognition operation regarding a user's uttered voice received through a microphone at operation S860.

Meanwhile, the electronic apparatus may determine the electronic apparatus of which voice recognition function is activated according to the type of a user request included in a user's uttered voice.

For example, the electronic apparatus may perform voice recognition regarding a user request included in the user's uttered voice, determine whether it is possible to perform an operation corresponding to the user request, and perform the operation corresponding to the user request based on a result of the determination.

If it is determined that it is not possible for the electronic apparatus to perform the operation corresponding to the user request, the electronic apparatus may transmit a control signal for controlling to perform the operation corresponding to the user request to another electronic apparatus.

In this case, the electronic apparatus may transmit the control signal to another electronic apparatus at the closest distance from the estimated utterance location from among a plurality of electronic apparatuses capable of performing the operation corresponding to the user request.

Accordingly, the user convenience can be improved as the electronic apparatus at the closest location from the user location from among the electronic apparatuses capable of performing the operation corresponding to the user request is selected to provide a service corresponding to the user request.

Meanwhile, computer instructions for performing processing operations according to the diverse embodiments of the disclosure described above may be stored in a non-transitory computer-readable medium. The computer instructions stored in the non-transitory computer-readable medium cause a specific device to perform the processing operations of the display apparatus according to the diverse embodiments described above when they are executed by a processor of the specific device.

The non-transitory computer-readable medium is not a medium that stores data for a while, such as a register, a cache, a memory, or the like, but means a medium that semi-permanently stores data and is readable by the device. Specific examples of the non-transitory computer-readable medium may include a compact disk (CD), a digital versatile disk (DVD), a hard disk, a Blu-ray disk, a universal serial bus (USB), a memory card, a ROM, and the like.

A method according to the various embodiments may be included in a computer program product and provided therein. The computer program product can be traded between a seller and a buyer as a product. The computer program product may be distributed in the form of a storage medium that can be read by machine (e.g., compact disc read only memory (CD-ROM)), or may be distributed online through an application store (e.g., PlayStore™). In the case of online distribution, at least a portion of the computer program product may be at least temporarily stored in a storage medium such as a memory of a server of a manufacturer, a server of an application store, or a relay server, or may be temporarily generated.

The programs for controlling an electronic apparatus according to an embodiment may be provided to various electronic apparatuses capable of performing a voice recognition function. For example, the programs may be applied to various apparatuses such as smart speakers, TVs, air conditioners, air purifiers, washing machines, refrigerators, robot cleaners, kitchen appliances, etc., but are not limited thereto. The apparatuses which are provided with the programs for controlling an electronic apparatus according to an embodiment may share information with other electronic apparatuses by performing communication and based on this, may perform the above-described operations of the electronic apparatus prior to estimating an utterance location, activating a voice recognition function, etc.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus configured to provide a voice recognition function, the apparatus comprising:
   a communication interface configured to communicate with other electronic apparatuses;
   a memory configured to store location information of the electronic apparatus and the other electronic apparatuses;
   a microphone configured to detect sound using a plurality of channels; and
   a processor configured to, based on a voice recognition function being activated, perform a voice recognition operation regarding a user's uttered voice received through the microphone,
   wherein the processor is configured to:
      based on a trigger voice being identified through the microphone, identify an utterance direction of the trigger voice,
      control the communication interface to share the identified utterance direction with the other electronic apparatuses,
      estimate an utterance location by calculating a contact point based on information regarding the utterance direction received from the other electronic apparatuses, the identified utterance direction, the location information of the electronic apparatus and the location information of the other electronic apparatuses,
      activate a voice recognition function of the electronic apparatus based on the stored location information and the estimated utterance location,
      identify a sound pressure of the trigger voice,
      control the communication interface to share information regarding the identified sound pressure together with information regarding the identified utterance direction,
      preferentially compare distances between the plurality of electronic apparatuses and an utterance location,
      based on a difference in distance being less than a predetermined value, determine a voice recognition apparatus of which input sound pressure is largest among a plurality of electronic apparatuses based on sound pressure information of the plurality of electronic apparatuses, and
      based on the electronic apparatus being the voice recognition apparatus, activate a voice recognition of the electronic apparatus.

2. The apparatus as claimed in claim 1, wherein the processor is further configured to, based on identifying that a distance between the estimated utterance location and the electronic apparatus is less than a distance between the other electronic apparatuses and the estimated utterance location, activate the voice recognition function.

3. The apparatus as claimed in claim 1,
   wherein the memory is further configured to store map information regarding an environment in which the electronic apparatus and the other electronic apparatuses are located, and
   wherein the stored location information is location information on a map in the map information.

4. The apparatus as claimed in claim 3, wherein the map information is generated in a robot cleaner capable of mapping a surrounding environment.

5. The apparatus as claimed in claim 1, wherein the processor is further configured to:
   based on the voice recognition function being activated, perform voice recognition regarding a user request included in the user's uttered voice,
   determine whether it is possible for the electronic apparatus to perform an operation corresponding to the user request, and
   perform the operation corresponding to the user request based on a result of the determination.

6. The apparatus as claimed in claim 5, wherein the processor is further configured to, based on determining that it is possible for the electronic apparatus to perform the operation corresponding to the user request, perform the operation corresponding to the user request.

7. The apparatus as claimed in claim 5, wherein the processor is further configured to, based on determining that it is not possible for the electronic apparatus to perform the operation corresponding to the user request, control the communication interface to transmit a control signal, for controlling to perform the operation corresponding to the user request, to another electronic apparatus.

8. The apparatus as claimed in claim 7, wherein the processor is further configured to control the communication interface to transmit the control signal to the other electronic apparatus located at a closest distance from the estimated utterance location from among a plurality of other electronic apparatuses capable of performing the operation corresponding to the user request.

9. A controlling method of an electronic apparatus configured to provide a voice recognition function, the method comprising:
   storing location information of the electronic apparatus and other electronic apparatuses;
   based on a trigger voice being identified through a microphone that detects sound using a plurality of channels, identifying an utterance direction of the trigger voice;
   sharing information regarding the identified utterance direction with the other electronic apparatuses;
   estimating an utterance location by calculating a contact point based on information regarding the utterance direction received from the other electronic apparatuses, the identified utterance direction, the location information of the electronic apparatus and the location information of the other electronic apparatuses;
   activating a voice recognition function of the electronic apparatus based on the stored location information and the estimated utterance location;

based on a voice recognition function being activated, performing a voice recognition function regarding a user's uttered voice received through the microphone;
identifying a sound pressure of the trigger voice;
sharing information regarding the identified sound pressure together with information regarding the identified utterance direction;
preferentially comparing distances between the plurality of electronic apparatuses and an utterance location;
based on a difference in distance being less than a predetermined value, determining a voice recognition apparatus of which input sound pressure is largest among a plurality of electronic apparatuses based on sound pressure information of the plurality of electronic apparatuses; and
based on the electronic apparatus being the voice recognition apparatus, activating a voice recognition of the electronic apparatus.

10. The method as claimed in claim 9, wherein the activating of the voice recognition function comprises, based on identifying that a distance between the estimated utterance location and the electronic apparatus is less than a distance between the other electronic apparatuses and the estimated utterance location, activating the voice recognition function.

11. The method as claimed in claim 9,
wherein the storing of the location information comprises storing map information regarding an environment in which the electronic apparatus and the other electronic apparatuses are located, and
wherein the stored location information is location information on a map in the map information.

12. The method as claimed in claim 11, wherein the map information is generated in a robot cleaner capable of mapping a surrounding environment.

* * * * *